J. H. STIMPSON.
Butter Bucket.
No. 21,220.
Patented Aug. 17, 1858.
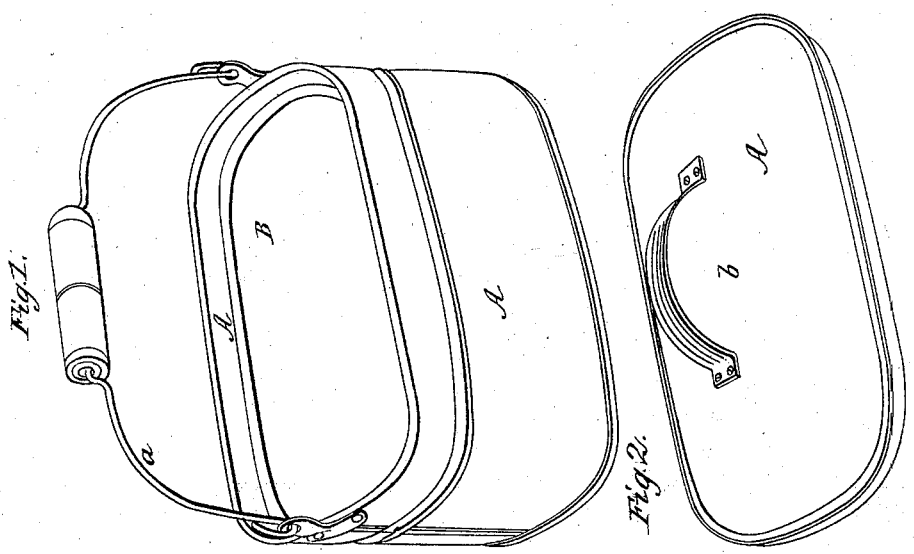
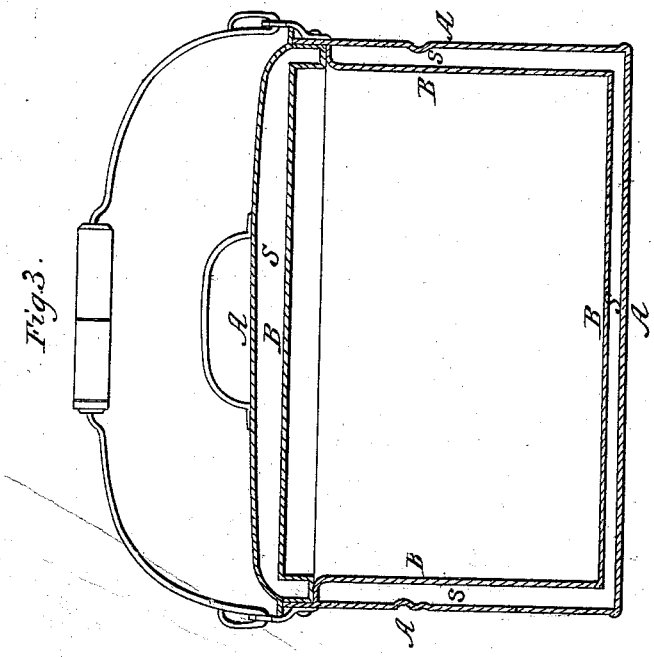

UNITED STATES PATENT OFFICE.

JAMES H. STIMPSON, OF BALTIMORE, MARYLAND.

BUTTER-BUCKET.

Specification of Letters Patent No. 21,220, dated August 17, 1858.

*To all whom it may concern:*

Be it known that I, JAMES H. STIMPSON, of Baltimore, State of Maryland, have invented a new Manufacture of Butter Bucket or Kettle, and that the following is a full, clear, and exact description of the principle or character which distinguishes it from all other things before known and of the usual manner of making, modifying, and using the same, reference being had to the accompanying drawings, of which—

Figure 1, is a perspective view of the bucket with the cover removed; Fig. 2, a perspective view of the cover; Fig. 3 a vertical middle section through the bucket and cover.

My invention consists in a new article of manufacture the same being an improvement of the common and well-known butter bucket or kettle, as set forth in the subjoined description and drawings.

The common butter bucket or kettle is in general appearance and outline similar to that shown in the drawings. It is often made of cylindrical form and is always made of "tin plate"—tinned sheet iron—is provided with a bail or handle $a$ and a cover $b$, and is made with one wall or of one thickness of tin. This article is of extensive and general use for carrying and keeping butter, but in hot weather it very often happens that the heat is so great within the bucket as to cause the butter to melt and "run" and thus spoil it for use.

By making this bucket with two walls A, B, as seen in the drawings a great economy is introduced in respect to the carrying and keeping of butter and other articles, for if, previous to use the whole bucket is cooled by cold water or ice or by remaining some time in a cool place, cool and hard butter or other articles placed in the bucket and covered tight will retain their temperature for a long time, heat from without being intercepted by the nonconducting space S, between the walls A, B.

What I claim is—

The new article of manufacture the same being the double walled-butter bucket or kettle constructed as herein above set forth.

JAMES H. STIMPSON.

Witnesses:
WM. A. MERKER,
WM. C. HAYWARD.